(12) United States Patent
Kim

(10) Patent No.: US 7,926,452 B1
(45) Date of Patent: Apr. 19, 2011

(54) PET LEASH DEVICE

(76) Inventor: Sok Kyu Kim, Los Angeles, CA (US)

( * ) Notice: Subject to any disclaimer, the term of this patent is extended or adjusted under 35 U.S.C. 154(b) by 36 days.

(21) Appl. No.: 12/622,072

(22) Filed: Nov. 19, 2009

(51) Int. Cl.
*A01K 27/00* (2006.01)

(52) U.S. Cl. .......................... 119/796; 119/799

(58) Field of Classification Search .......... 119/778–781, 119/786, 788, 791, 792, 795–799
See application file for complete search history.

(56) References Cited

U.S. PATENT DOCUMENTS

| | | | | |
|---|---|---|---|---|
| 2,337,970 A | * | 12/1943 | Cassell | 119/799 |
| 2,981,230 A | * | 4/1961 | Putnam | 119/780 |
| 2,994,501 A | | 8/1961 | Barnard | |
| 3,244,149 A | * | 4/1966 | Bosko et al. | 119/795 |
| 3,376,855 A | * | 4/1968 | Mescher | 119/712 |
| 3,964,441 A | * | 6/1976 | Wall | 119/796 |
| 4,182,272 A | * | 1/1980 | Taff | 119/795 |
| D255,259 S | | 6/1980 | Nelson | |
| 4,919,379 A | | 4/1990 | Goetz | |
| 5,632,233 A | * | 5/1997 | Kovach | 119/771 |
| 5,638,772 A | | 6/1997 | Kaufmann et al. | |
| 6,053,129 A | * | 4/2000 | Akre | 119/795 |
| 6,170,500 B1 | * | 1/2001 | Turechek | 135/66 |
| 6,612,263 B2 | * | 9/2003 | Scheid et al. | 119/787 |
| 6,820,573 B1 | * | 11/2004 | McMullin | 119/791 |
| 7,013,840 B2 | | 3/2006 | Leon | |
| 2005/0005876 A1 | | 1/2005 | Calvi | |
| 2006/0218844 A1 | | 10/2006 | Oliver et al. | |
| 2007/0039563 A1 | * | 2/2007 | Keller | 119/799 |

FOREIGN PATENT DOCUMENTS

JP 2010213670 A * 9/2010

* cited by examiner

*Primary Examiner* — Kimberly S Smith

(57) ABSTRACT

A pet leash device comprising a housing with a retractor component and leash; a plurality of telescopic poles extending from the housing, wherein each telescopic pole can rotate in a first direction and a second direction with respect to the housing, wherein each telescopic pole can be locked in an extended position via a lock mechanism; wherein the leash component can extend out of the leash device at various positions via slits disposed in the housing, along the first telescopic pole, along the second telescopic pole, or along the third telescopic pole, wherein rotation of a telescopic pole rotates its respective slit away from the other slits allowing the leash component to be locked at a particular position along the leash device; a clip disposed on the leash component for attaching to a pet collar; and a clamp disposed on the housing allowing attachment to the stroller or carriage.

4 Claims, 5 Drawing Sheets

Bottom View

PET LEASH DEVICE

FIELD OF THE INVENTION

The present invention is directed to a leash for pets. More particularly, the present invention is directed to a pet leash for use with a stroller or baby carriage.

BACKGROUND OF THE INVENTION

Many people find it cumbersome to hold a leash and push a stroller at the same time. The present invention features a pet leash device for attaching to a stroller or baby carriage. The pet leash device of the present invention may also be used as a walking stick or attached to a walking stick.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
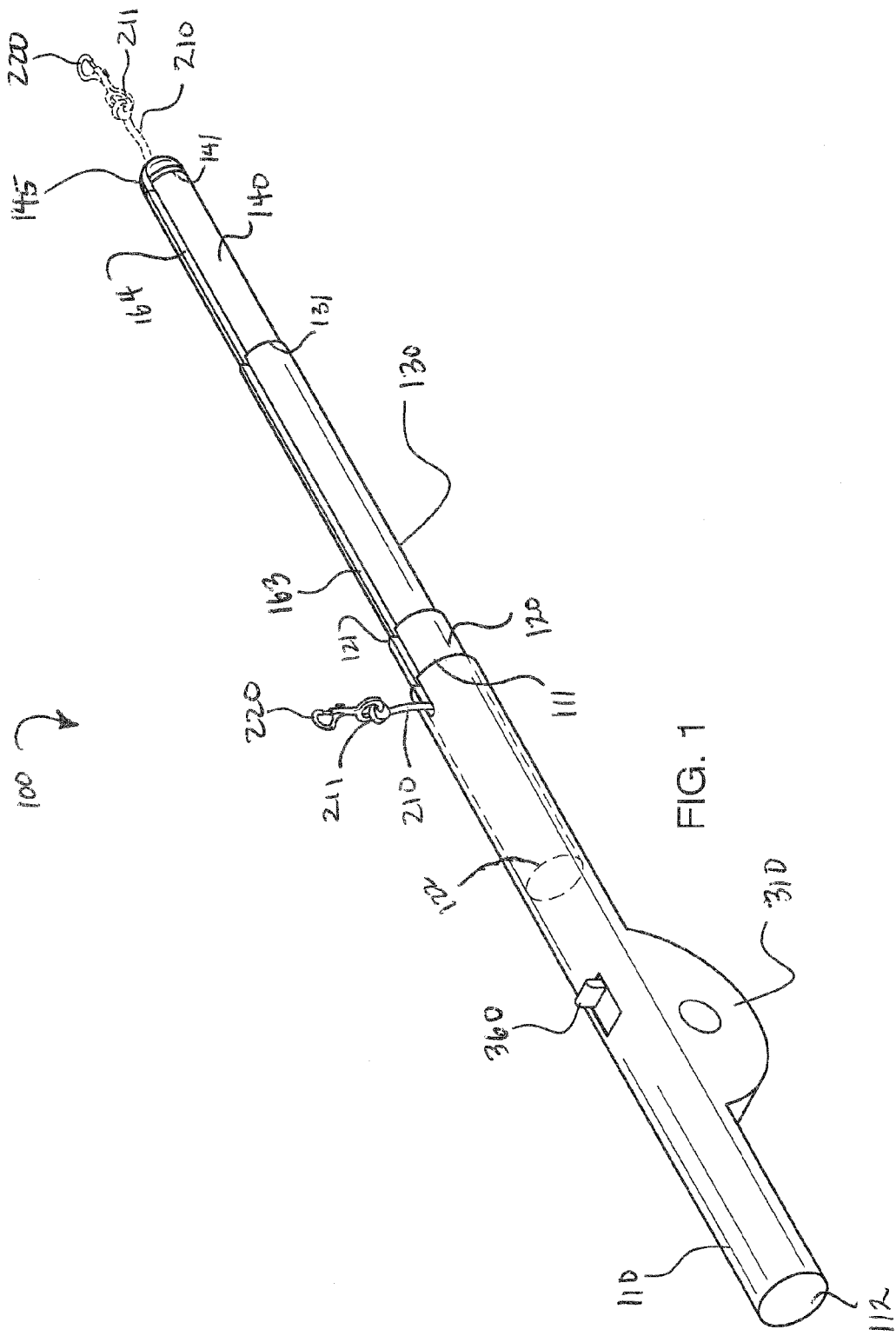
FIG. 1 is a perspective view of the pet leash device of the present invention.
Figure 2:
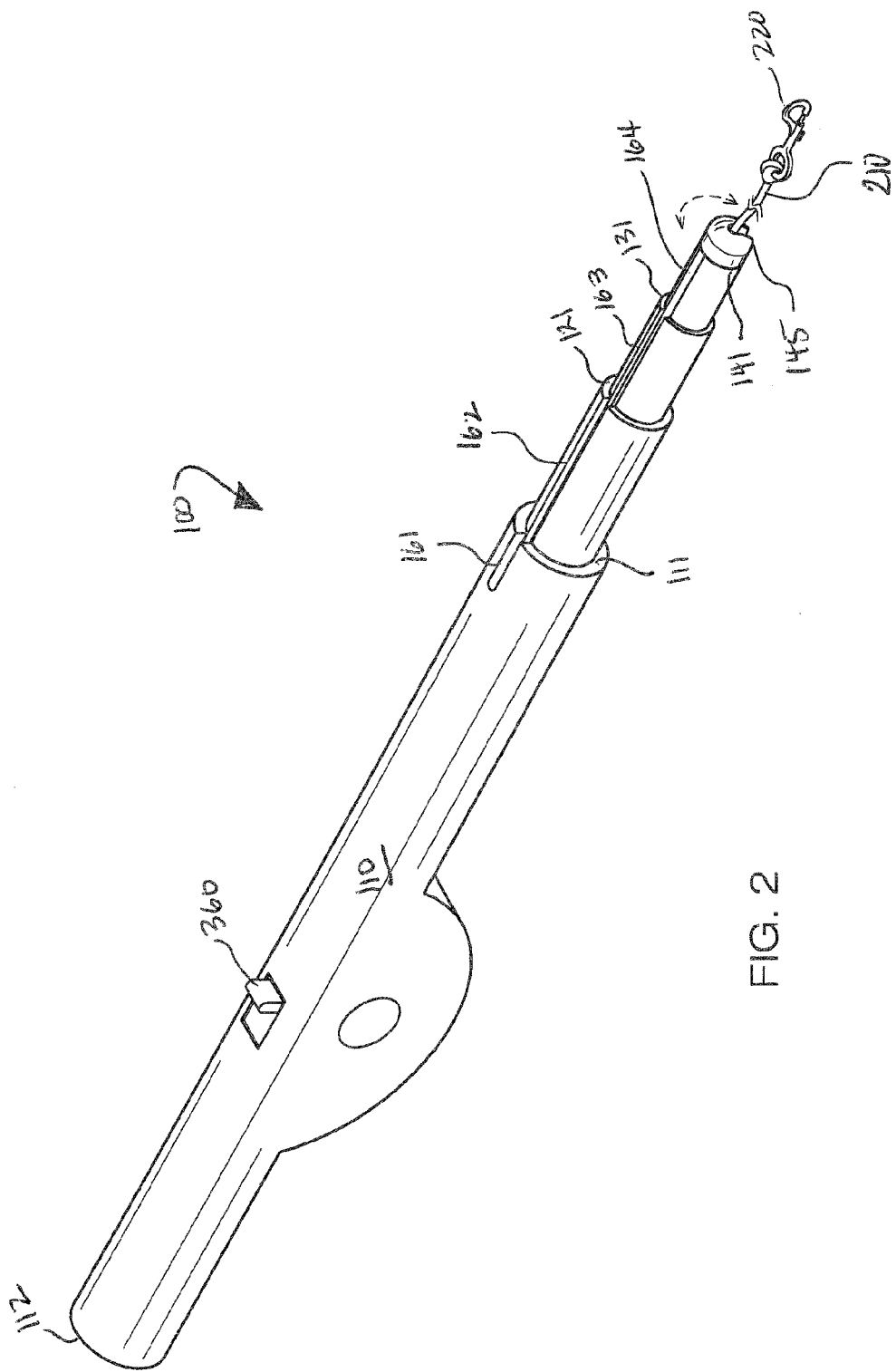
FIG. 2 is a perspective view of the pet leash device of the present invention.
Figure 3:
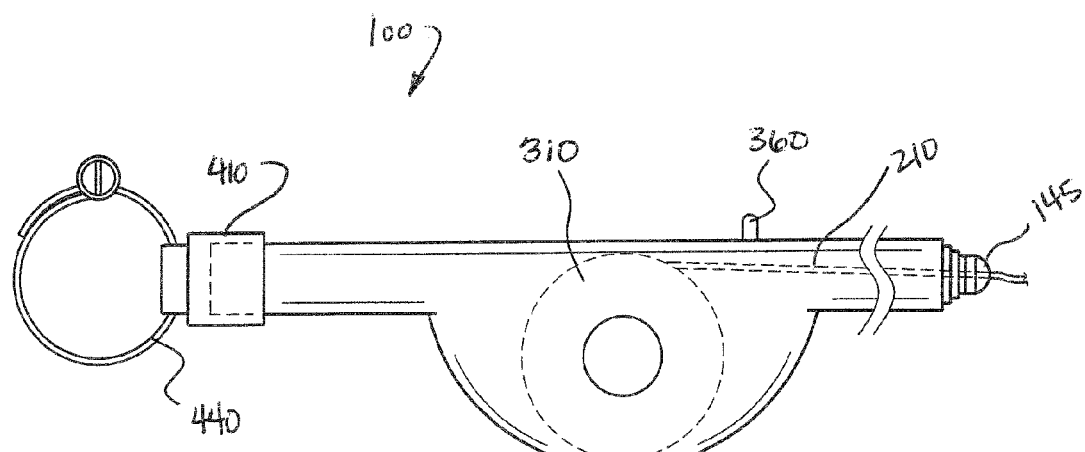
FIG. 3 is a side view of the pet leash device of the present invention.
Figure 4:
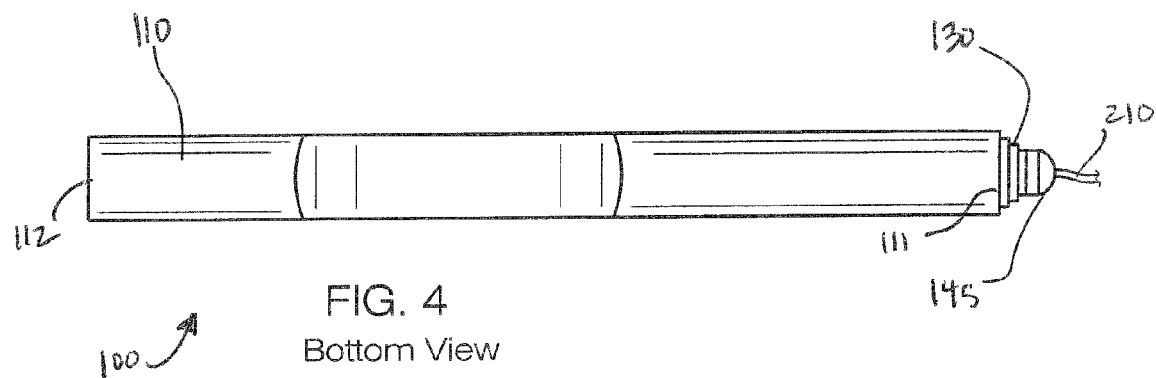
FIG. 4 is a bottom view of the pet leash device of the present invention.
Figure 5:
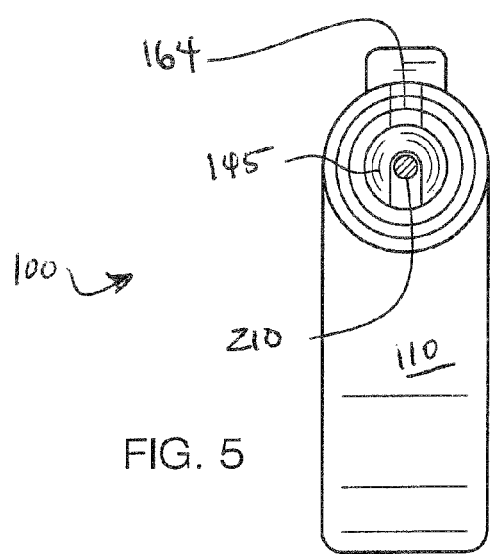
FIG. 5 is a front view of the pet leash device of the present invention.
Figure 6:
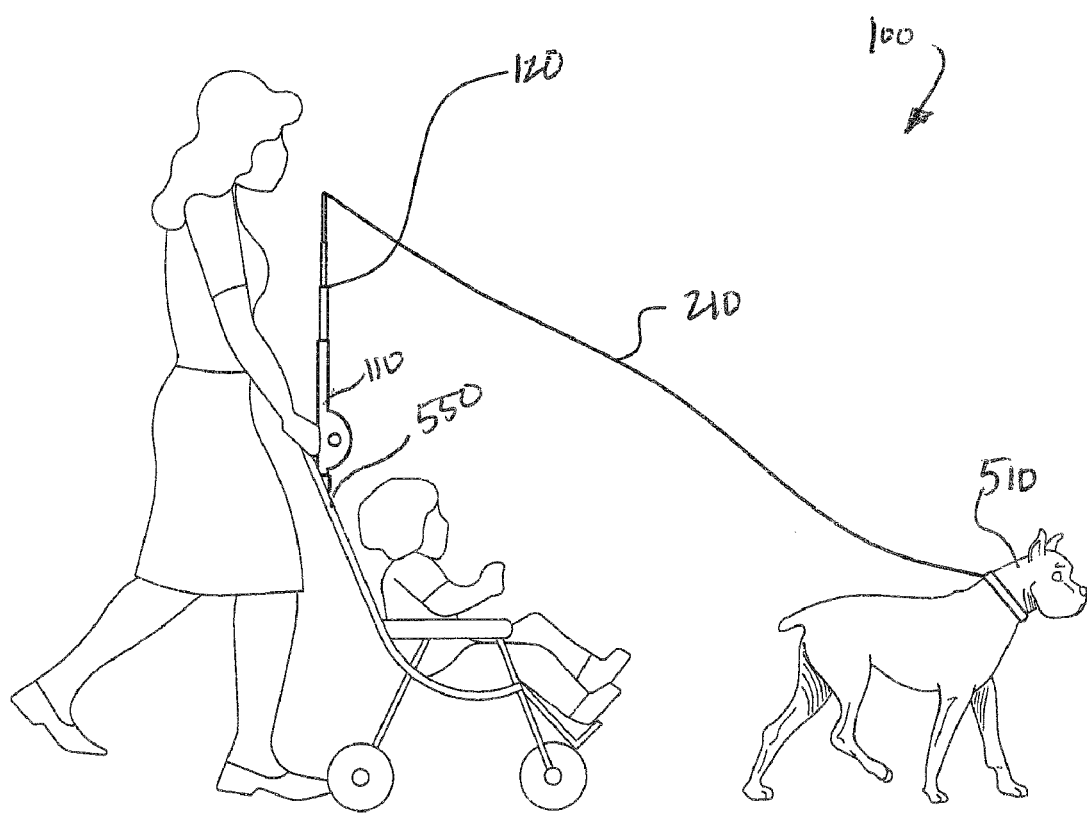
FIG. 6 is a side view of the pet leash device of the present invention, wherein the pet leash device is attached to a stroller.
Figure 7:
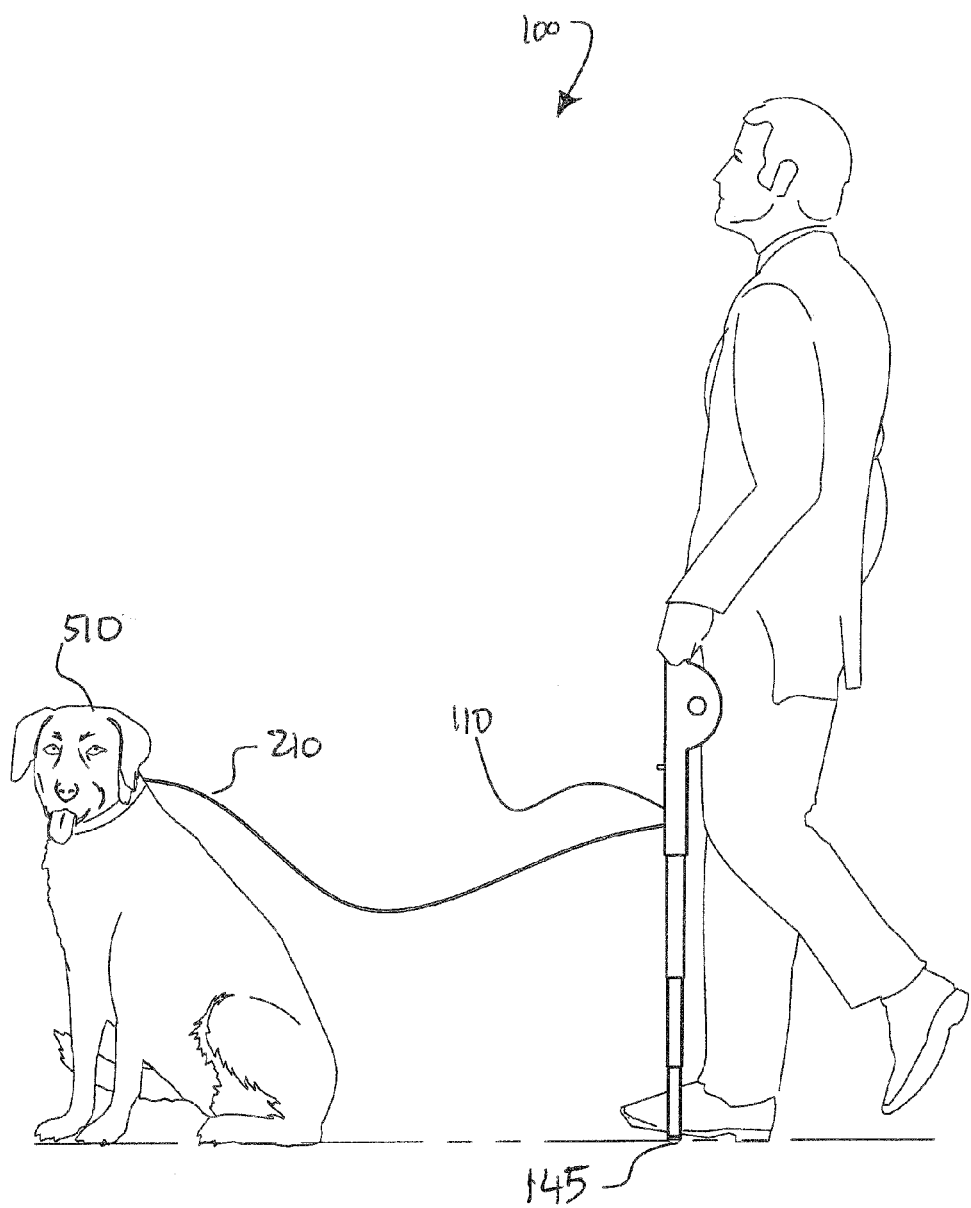
FIG. 7 is a side view of the pet leash device of the present invention, wherein the pet leash device is used as a walking stick.

Referring now to FIGS. 1-7, the present invention features a pet leash device 100 for use with a baby carriage or a stroller. The pet leash device of the present invention comprises a housing 110 having a first end 111 and a second end 112, wherein the second end 112 is used as a handle. A leash component 210 can extend out from the first end 111.

The leash device 100 is expandable and retractable via a telescopic mechanism. For example, a first telescopic pole 120 having a first end 121 and a second end 122 is telescopically received in the first end 111 of the housing 110. A second telescopic pole 130 having a first end 131 and a second end is telescopically received in the first telescopic pole 120, and a third telescopic pole 140 having a first end 141 and a second end is telescopically received in the second telescopic pole 130. The telescopic poles allow the length of the housing 110 to be adjusted according to the user's needs. Each telescopic pole can be locked in an extended position via a lock mechanism, for example a spring-loaded pin and aperture mechanism. These lock mechanisms are well known to one of ordinary skill in the art, for example spring-loaded pins and apertures are commonly used to lock telescopic components of umbrellas.

The leash component 210 can be pulled out at a designated position along the housing 110 or telescopic poles. The leash component 210 can extend out of the first end 111 of the housing 110 via a first slit 161 at the first end 111 of the housing 110. In some embodiments, the leash component 210 can extend from the first telescopic pole 120 via a second slit 162 disposed along the length of the first telescopic pole 120 as measured from the first end 121 to the second end 122. In some embodiments, the leash component 210 can extend from the second telescopic pole 130 via a third slit 163 disposed along the length of the second telescopic pole 130 as measured from the first end 131 to the second end. In some embodiments, the leash component 210 can extend from the third telescopic pole 140 via a fourth slit 164 disposed along the length of the third telescopic pole 140 as measured from the first end 141 to the second end. The slits can be aligned with one another so that the leash component 210 can moved through the housing and the poles at one time.

The leash component 210 can be secured in a particular position along the housing 110 or telescopic poles by rotating the telescopic poles with respect to each other (twisting in a first direction or second direction). This moves the slits, blocking the movement of the leash backwardly through the other slits.

The leash component 210 has a first end 211 and a second end, wherein the first end 211 extends out from the housing 110 and/or telescopic poles. Disposed on the first end 211 of the leash component 210 is a clip 220 for attaching to a collar of a pet 510. The second end of the leash component 210 is attached to a retractor component 310 disposed in the housing 110.

Retractor components and mechanisms of extending and retracting are well know to one of ordinary skill in the art. For example, retractor components are commonly used in leases. In some embodiments, the retractor component 310 of the pet leash device 100 of the present invention comprises a lock 360 for allowing a user to lock the retractor component 310 (the mechanism of extending and retracting) to prevent the leash component 210 extending further from the housing 110. In some embodiments, the retractor component 310 has a swivel base (e.g., a ball joint with a quick release) for allowing the retractor component 310 to move. The swivel base may help prevent the pet from getting entangled.

Disposed on the second end of the housing 110 is a clamp adaptor 410 that allows a clamp 440 to be attached to the housing 110. The clamp 440 allows a user to attach the pet leash device 100 to a handle 550 of a stroller or a carriage (see FIG. 6). When the pet leash device 100 is attached to a stroller or carriage, the user does not need to hold the leash device 100.

The pet leash device 100 of the present invention may be constructed from a variety of materials. For example, in some embodiments, the pet leash device 100 is constructed from a material comprising a plastic, a leather, a metal, the like, or a combination thereof.

The pet leash device 100 may be constructed in a variety of sizes. In some embodiments, the housing 110 is between about 8 to 12 inches in length as measured from the first end 111 to the second end 112. In some embodiments, the housing 110 is between about 12 to 18 inches in length as measured from the first end 111 to the second end 112. In some embodiments, the housing 110 is more than about 18 inches in length.

In some embodiments, the pet leash device 100 of the present invention can be used as a walking stick or can be attached to a walking stick. In some embodiments, a tip 145 is disposed on the first end 141 of the third telescopic pole 140. The tip 145 may help protect against damage to the telescopic pole 140 or may provide a gripping component for stability when used as a walking stick.

The following the disclosures of the following U.S. Patents are incorporated in their entirety by reference herein: U.S. Pat. No. 2,994,501; U.S. Pat. No. 4,919,379; U.S. Pat. No. 7,013,840; U.S. Pat. No. 5,638,772; U.S. Pat. Application No. 2006/0218844; U.S. Pat. No. 2005/0005876.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A pet leash device for use with a baby carriage or a stroller, said pet leash device comprising:
    (a) a housing with a retractor component disposed therein, wherein a second end of a leash component is attached to the retractor component;
    (b) a first telescopic pole telescopically received in a first end of the housing, a second telescopic pole telescopically received in a first end of the first telescopic pole, and a third telescopic pole telescopically received in a first end of the second telescopic pole, wherein each telescopic pole can rotate in a first direction and a second direction with respect to the housing, wherein each telescopic pole can be locked in an extended position via a lock mechanism;
    wherein the leash component can extend out of the leash device at various positions including out of a first slit disposed in the first end of the housing, a second slit disposed along the first telescopic pole, a third slit disposed along the second telescopic pole, or a fourth slit disposed along the third telescopic pole, wherein rotation of a telescopic pole rotates its respective slit away from the slits of the other telescopic pole and housing allowing the leash component to be locked at a particular position along the leash device;
    (c) a clip disposed on a first end of the leash component for attaching to a collar of a pet; and
    (d) a clamp disposed on a second end of the housing allowing the housing to attach to a handle of the stroller or the carriage.

2. The leash device of claim 1, wherein the lock mechanism is a spring-loaded pin and aperture mechanism.

3. The leash device of claim 1, wherein the retractor component comprises a lock for locking movement of the retractor component to prevent the leash component from extending.

4. The leash device of claim 1, wherein the clamp is attached to the housing via a clamp adaptor.

* * * * *